United States Patent
Scratchley et al.

(10) Patent No.: US 7,161,409 B2
(45) Date of Patent: Jan. 9, 2007

(54) PRECISION, LOW DRIFT, CLOSED LOOP VOLTAGE REFERENCE

(75) Inventors: Douglas A. Scratchley, St. Petersburg, FL (US); Quan T. Nguyen, Valrico, FL (US); Ernest Graetz, Largo, FL (US)

(73) Assignee: Honeywell International Inc.

( * ) Notice: Subject to any disclaimer, the term of this patent is extended or adjusted under 35 U.S.C. 154(b) by 78 days.

(21) Appl. No.: 10/898,787

(22) Filed: Jul. 26, 2004

(65) Prior Publication Data

US 2006/0017492 A1    Jan. 26, 2006

(51) Int. Cl.
G05F 1/46   (2006.01)
G05F 3/08   (2006.01)
H02M 3/22   (2006.01)

(52) U.S. Cl. .................. 327/536; 327/540; 363/59
(58) Field of Classification Search ............. None
See application file for complete search history.

(56) References Cited

U.S. PATENT DOCUMENTS

| | | | |
|---|---|---|---|
| 3,869,659 A * | 3/1975 | Doong et al. | 363/60 |
| 4,222,003 A | 9/1980 | Kline | |
| 4,481,566 A * | 11/1984 | Hoffman et al. | 363/60 |
| 6,370,046 B1 | 4/2002 | Nebrigic et al. | |
| 6,518,828 B1 * | 2/2003 | Seo et al. | 327/534 |
| 2002/0093318 A1 | 7/2002 | Wallis | |
| 2004/0080964 A1 * | 4/2004 | Buchmann | 363/60 |
| 2004/0110330 A1 | 6/2004 | Collard | |
| 2005/0052220 A1 * | 3/2005 | Burgener et al. | 327/536 |

FOREIGN PATENT DOCUMENTS

| | | |
|---|---|---|
| EP | 0 818 875 A2 | 1/1998 |
| GB | 2 226 664 A | 7/1990 |

* cited by examiner

Primary Examiner—Timothy P. Callahan
Assistant Examiner—Terry L. Englund
(74) Attorney, Agent, or Firm—David N. Fogg; Fogg & Associates, LLC

(57) ABSTRACT

A voltage reference circuit receives an input voltage through a first port and a time varying input signal through a second port. The voltage reference circuit includes a switching circuit that is responsive to the first and the second ports and that generates an AC signal from the input voltage. The voltage reference circuit further includes a voltage multiplier circuit, coupled to the switching circuit that receives the AC signal and creates a DC signal with a selected voltage level. The voltage reference circuit further includes a voltage regulator, coupled to the voltage multiplier circuit that regulates the DC signal from the voltage multiplier circuit. A regulated output voltage is provided through an output port.

30 Claims, 7 Drawing Sheets

(Block Diagram)

Fig. 1 (Block Diagram)

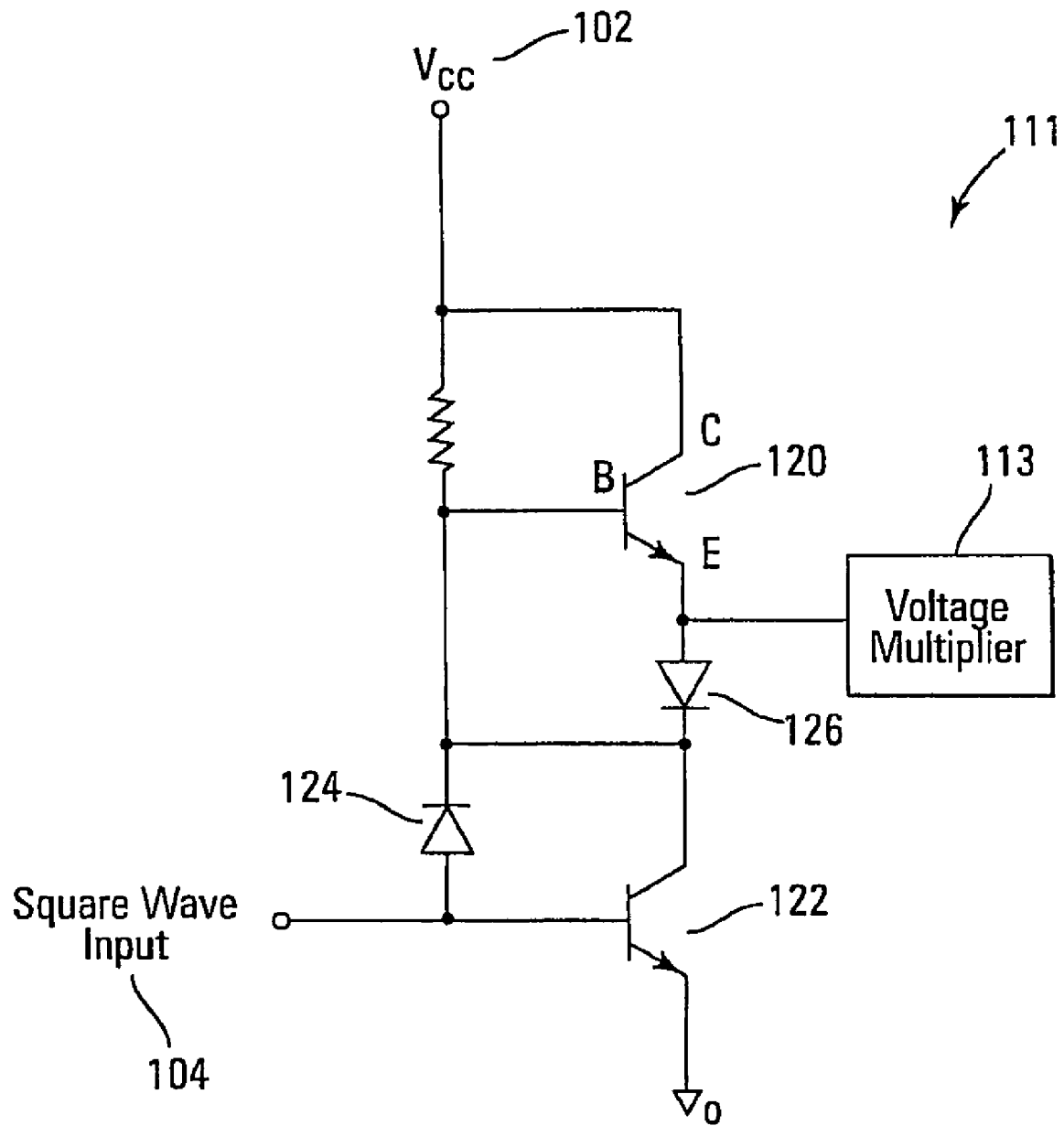
*Fig. 3* (Switching Circuit)

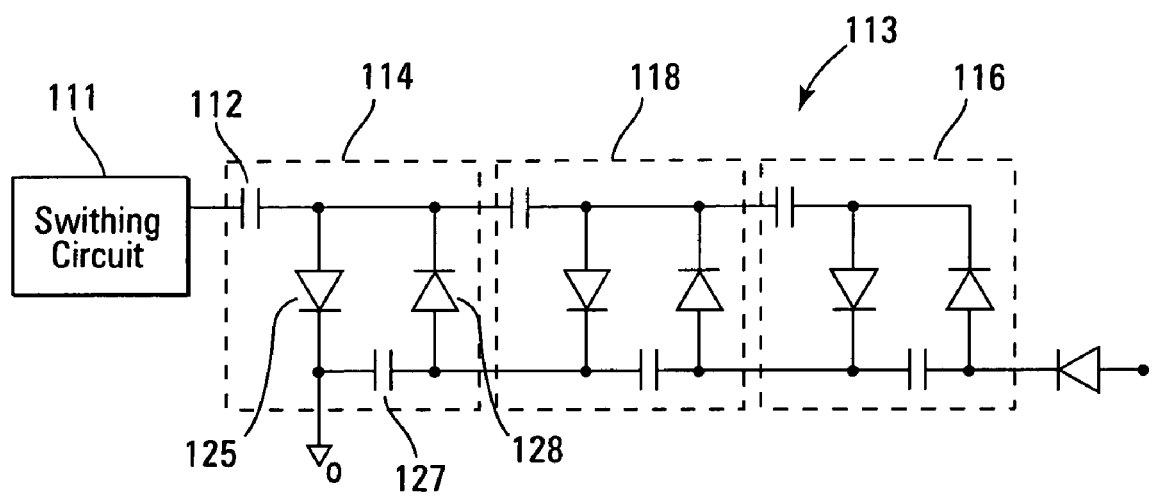
*Fig. 4* (Voltage Multiplier)

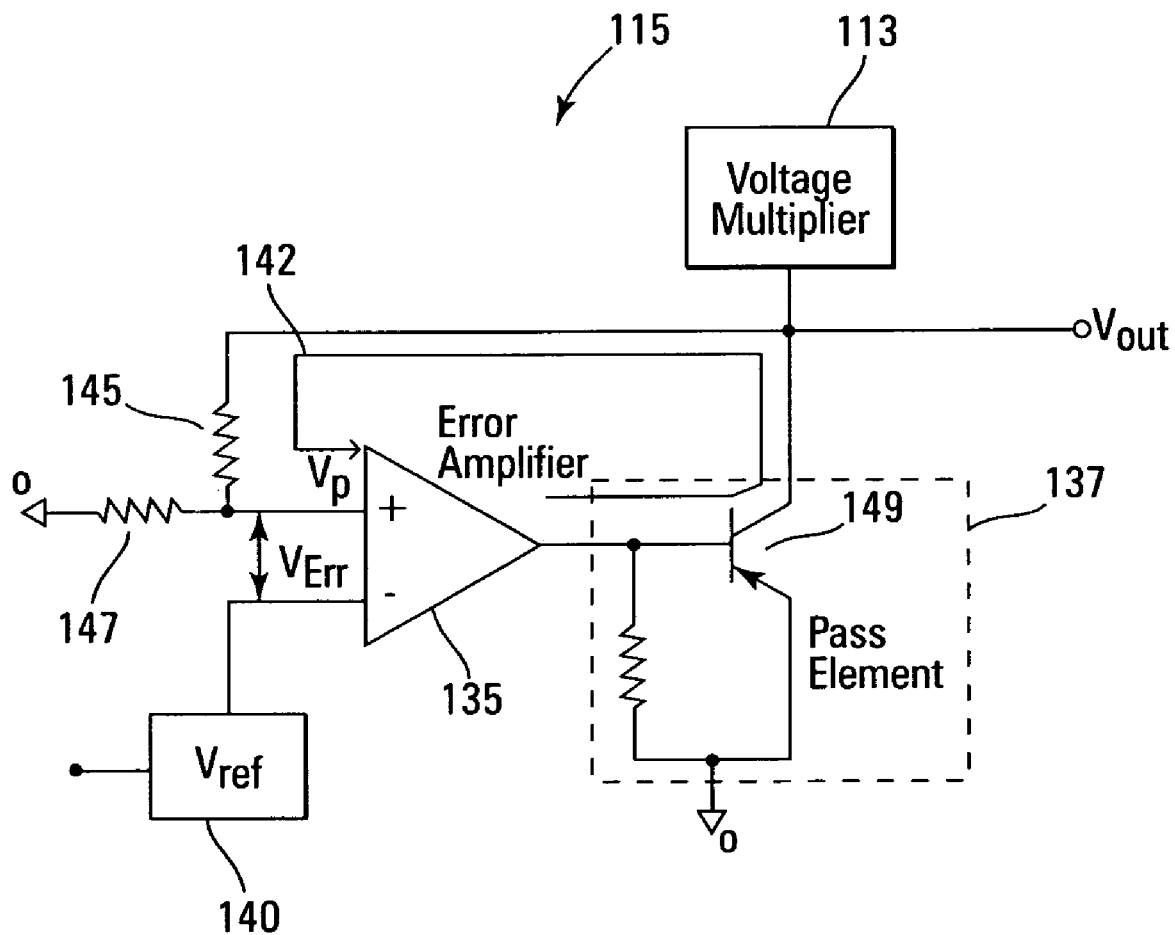
Fig. 5 (Voltage Regulator)

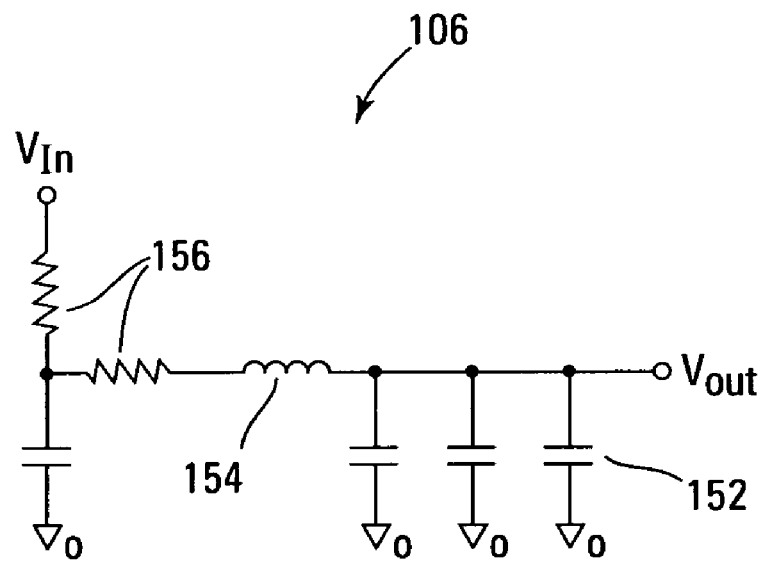
*Fig. 6a*   (Filter for V_cc)
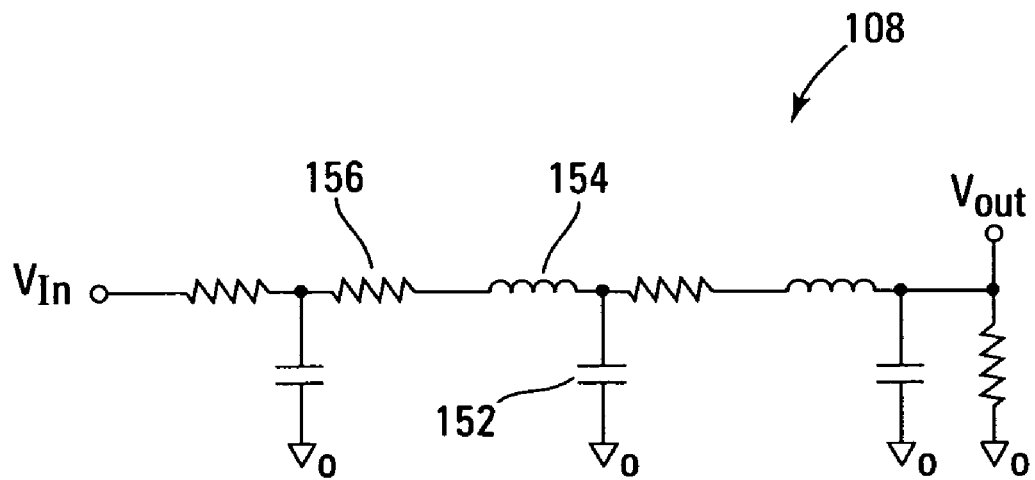
*Fig. 6b*   (Filter for Output)

PRECISION, LOW DRIFT, CLOSED LOOP VOLTAGE REFERENCE

TECHNICAL FIELD

The following description relates generally to the field of electronic circuits, and more particularly to a precision, low drift, closed loop voltage reference.

BACKGROUND

Voltage references are used pervasively throughout electronics applications. They are used to supply stable unvarying voltages to other systems and circuits. For circuits such as instrumentation and test equipment, data acquisition systems, portable devices, medical equipment, analog to digital converters, digital to analog converters, and sensors, precision voltage references constitute critical circuit elements.

Common problems that voltage references encounter comprise shifts in the output voltage. For example, a voltage reference may shift due to changing thermal conditions. Furthermore, a voltage reference is also susceptible to lifetime shifts, known as long term voltage drift, that occur gradually as systems and circuits are used. These problems can be exacerbated if the reference voltage circuit is designed to consume a minimum of power supply current. Many reference voltage circuits are also susceptible to voltage changes due to radiation. Where a voltage reference circuit is to be used in a radiation rich environment, maintaining the stability of the reference voltage becomes increasingly problematic. One approach to ameliorate inaccuracy caused by radiation is to provide radiation shielding. However, this solution can be costly and uses valuable space in systems wherein such space might be limited.

Voltage references also suffer from other common limitations. For example, many voltage references are normally only used with small stable loads. Other voltage references are incapable of providing a stable high voltage output. Few voltage references can provide a load above a few milliamps and still maintain a stable precision output voltage. This introduces problems where larger loads are desirable or necessary. It also restricts or prohibits the use of reference voltage circuits where a changing load is necessary.

One application in which the mentioned problems are encountered is that of sensor equipment used where the atmosphere is thin or nonexistent, such as in space. Sensors require tight tolerances for their reference voltages to accurately detect the required phenomena. Therefore, even slight variations in the reference voltage may be unacceptable. A combination of the above design problems makes the use of reference voltages in high radiation environments problematic, particularly when used in sensor circuits. Therefore, there exists a need in the art for extremely stable, precise, high voltage references. This need is magnified in certain applications such as those used in space.

SUMMARY

In one embodiment, the invention advantageously provides a voltage reference circuit. The voltage reference circuit includes a first port, adapted to receive an input voltage; a second port, adapted to receive a time varying input signal; and a switching circuit, responsive to the first and second ports. The switching circuit generates an AC signal from the input voltage. The voltage reference circuit further includes a voltage multiplier circuit, coupled to switching circuit to receive the AC signal and to create a DC signal with a selected voltage level; a voltage regulator, coupled to the voltage multiplier circuit, that regulates the DC signal from the voltage multiplier circuit; and an output port that is adapted to provide an output voltage.

In accordance with another aspect of the invention, it provides an electronic device attached to a voltage reference. The voltage reference includes a first port adapted to receive an input voltage; a second port adapted to receive a time varying input signal; and a switching circuit, responsive to the first and second ports. The switching circuit generates an AC signal from the input voltage. The voltage reference further includes a voltage multiplier circuit, coupled to switching circuit to receive the AC signal and to create a DC signal with a selected voltage level; a voltage regulator, coupled to the switching signal, that regulates the DC signal from the switching circuit; and an output port that is adapted to provide an output voltage.

In accordance with another aspect of the invention, it provides a method for supplying a reference voltage. The method includes generating an alternating current signal from a direct current input voltage and a time varying input signal; generating a DC voltage signal from the alternating current signal that is greater in magnitude than the direct current input voltage; regulating the generated DC voltage; and delivering the regulated DC voltage.

In accordance with still another aspect of the invention, it provides a voltage reference apparatus. The voltage reference apparatus includes a switching circuit that generates an AC signal from a DC input and a time varying input signal; a voltage multiplier circuit, coupled to the output of the switching circuit, that receives the AC signal and generates a DC signal with a selected voltage level; and a voltage regulator circuit, coupled to the voltage multiplier circuit, that regulates the DC signal from the voltage multiplier circuit.

In accordance with yet another aspect of the invention, it provides a method for supplying a reference voltage. The method for includes introducing a direct current input voltage; filtering the direct current input voltage; introducing a time varying input signal; generating an alternating current signal from the filtered direct current input voltage and the time varying input signal; generating a DC voltage signal from the alternating current signal that is greater in magnitude than the direct current input voltage; regulating the generated DC voltage; filtering the regulated DC voltage; and delivering the regulated DC voltage.

DRAWINGS

FIG. 3 is a circuit diagram of a switching circuit in accordance with an embodiment of the present invention;

FIG. 4 is a circuit diagram of a voltage multiplier circuit in accordance with an embodiment of the present invention;

FIG. 5 is a circuit diagram of a voltage regulator in accordance with an embodiment of the present invention;

FIG. 6a is a circuit diagram of an input filter in accordance with an embodiment of the present invention;

FIG. 6b is a circuit diagram of an output filter in accordance with an embodiment of the present invention.

DETAILED DESCRIPTION

The primary embodiments of the invention will now be discussed in detail, examples of which are illustrated in the accompanying figures. Illustrated embodiments are presented by way of example and are not to be construed as limitations. All alternatives, modifications, and equivalents that fall within the scope and spirit of the invention are incorporated herein. For example, it is understood by a person of ordinary skill in the art that a transformer may be used in place of a cascade voltage multiplier to achieve the same increased voltage output.

Embodiments of the present invention may be employed in combination with other circuit designs, such as those that require a stable high voltage reference. This description is presented with enough detail to provide an understanding of the present invention, and to enable one of ordinary skill in the art to build a precision, low drift, closed loop voltage reference. This detailed description should not be construed to encompass all necessary materials in circuit production or operation.

Figure 1:
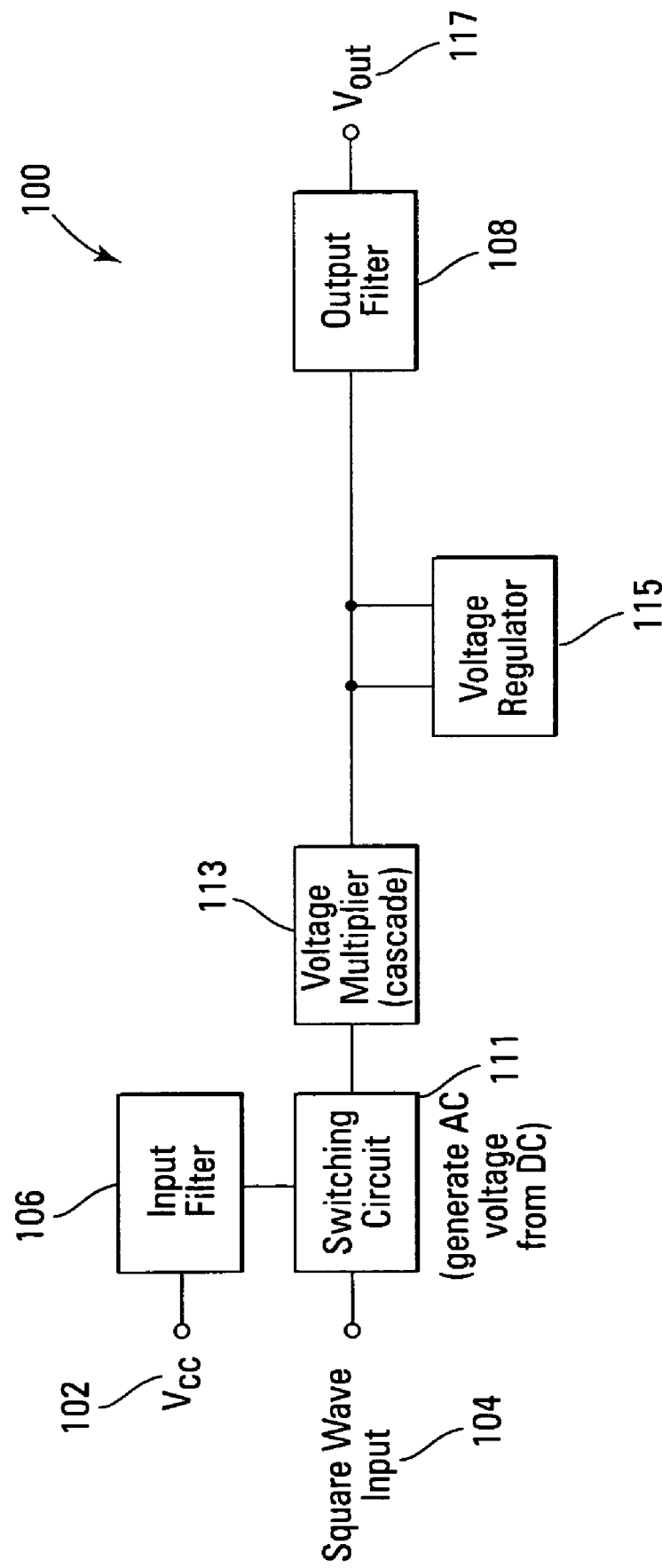
FIG. 1 is a block diagram of a voltage reference circuit in accordance with an embodiment of the present invention.

Referring more particularly to the drawings, FIG. 1 illustrates a block diagram of a voltage reference circuit 100 in accordance with an embodiment of the present invention. The voltage reference circuit 100 comprises an input voltage 102, a time varying input signal 104, an input filter 106 and output filter 108, a switching circuit 111, a voltage multiplier circuit 113, a voltage regulator 115, and a voltage output 117. In one embodiment, the input voltage 102 comprises a standard constant voltage source. In one embodiment the voltage source provides a constant ±15 volts. Standard voltage sources have a five percent error, therefore in certain embodiments the voltage provided is 15±0.75 volts.

The input voltage 102 travels through the input filter 106 to attenuate or eliminate any initial noise or irregularities generated by the voltage source. The filtered input voltage 102 and time varying input signal 104 are both received by the switching circuit 111. The switching circuit 111 generates an AC output based on these DC signals and sends it to the voltage multiplier circuit 113. A voltage multiplier circuit 113 is a passive circuit, for example, a collection of passive devices such as capacitors, and diodes, arranged to produce a multiple of the input voltage at the output. The voltage multiplier circuit 113 steps up the voltage above the level of the input voltage 102 according to the circuit design, and outputs the multiplied voltage. The multiplied voltage output constitutes a direct current voltage. A voltage regulator 115 monitors the voltage being output by the voltage multiplier circuit 113 and modifies it to maintain a constant value. The voltage is finally sent through an output filter 108 to reduce any ripple or noise that was generated by the circuit or by interactions with nearby circuits. The result is a stable, precise, high voltage output 117 that can be used as a reference voltage.

Figure 2:
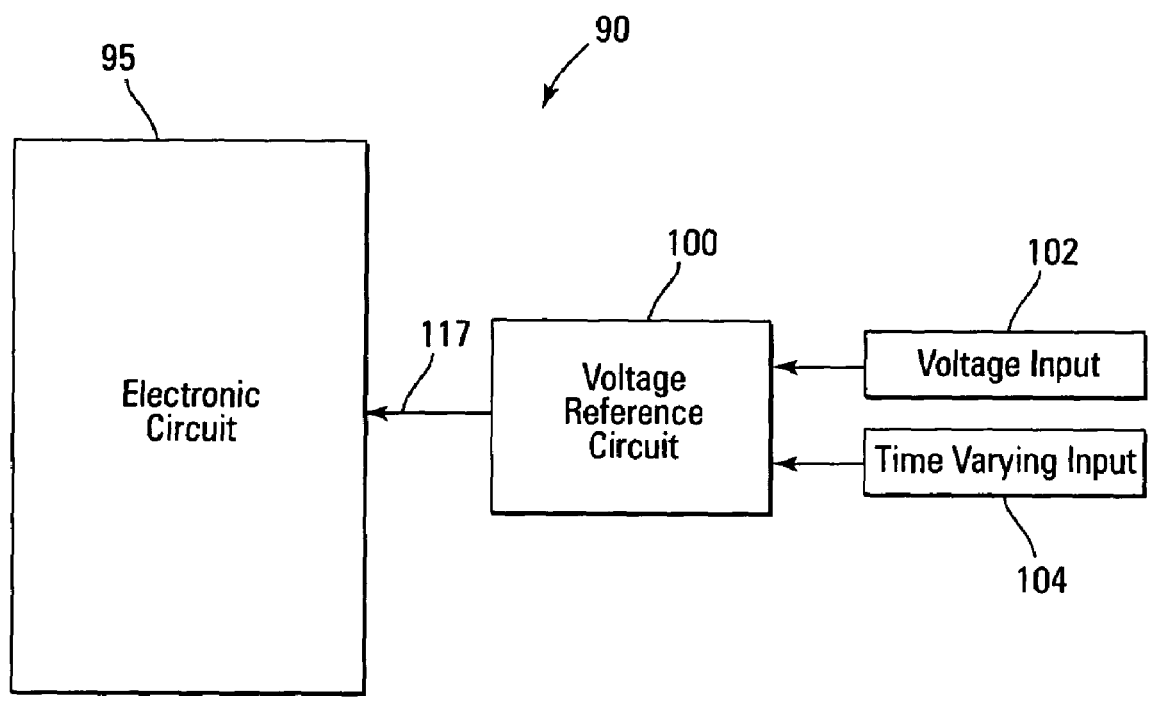
FIG. 2 is a block diagram of an electronic device in accordance with an embodiment of the present invention.

FIG. 2 is a block diagram of an electronic device, shown generally at 90. The electronic device 90 comprises an electronic circuit 95 connected to a voltage reference circuit 100. The voltage reference circuit 100 receives a voltage input 102 and a time varying input signal 104, from which it generates a stable, precise, high voltage output 117 that is input into the electronic circuit 95. In one embodiment the electronic circuit 95 comprises a sensor circuit and the electronic device 90 comprises a sensor, such as a Micro-Electro-Mechanical System (MEMS) inertial sensor.

FIG. 3 is a circuit diagram of a switching circuit 111 in accordance with an embodiment of the present invention. The switching circuit 111 is used to generate an AC voltage output from a DC voltage input. This process is referred to as voltage conversion. In one embodiment, the switching circuit 111 achieves voltage conversion through the use of a first NPN junction transistor 120 and a second NPN junction transistor 122. A time varying input signal 104 and input voltage 102 are introduced into the circuit as shown. In one embodiment, the time varying input signal 104 comprises a square wave input. In other embodiments, the time varying input signal 104 comprises a triangle wave input, or a sinusoidal input. The time varying input signal 104 is a pulse train or clock whose frequency is selected from a range of frequencies, for example, between 125 kHz and 500 KHz. At 500 KHz the voltage multiplier circuit 113 provides better voltage regulation, that is, the voltage does not drop rapidly as a function of output current. However, the higher frequency has the drawback of generating additional noise that can couple into surrounding electronics, having an adverse affect on the precision of the reference voltage. At 125 KHz, the voltage multiplier circuit 113 generates less noise, but provides less stable voltage regulation. These competing features create a system tradeoff, wherein the user must balance the need for precision of the voltage reference and the need to regulate the voltage emerging from the voltage regulator 115. In one embodiment, the pulse train has a frequency of 250 KHz.

The time varying input signal 104 may alternate, for example, between a negative and a positive voltage, or between zero volts and a positive voltage. In one embodiment the time varying input signal 104 comprises a square wave input that alternates between zero and five volts. When the time varying input signal 104 is at zero volts, a higher potential is applied to the base than the emitter of the first NPN junction transistor 120, and it is activated, inserting fifteen volts into the voltage multiplier circuit 113. Meanwhile the second NPN junction transistor 122 remains off. When the time varying input signal 104 is at five volts, the potential at the emitter of the first NPN junction transistor 120 is greater than the potential at its base, turning it off. Simultaneously, the second NPN junction transistor 122 is activated, and the input voltage 102 is grounded. Thus no charge is applied to the voltage multiplier circuit 113. A first diode 124 ensures that the second NPN junction transistor 122 remains inactive while the time varying input signal 104 is at zero, and a second diode 126 ensures that the voltage multiplier circuit 113 does not receive any charge when the time varying input signal 104 is at five volts.

FIG. 4 depicts a circuit diagram of one embodiment of a voltage multiplier circuit 113 in connection with the switching circuit 111. In the illustrated embodiment, the voltage multiplier circuit 113 comprises a first stage 114, a second stage 118, through an nth stage 116. Each stage comprises a primary capacitor 112, a primary diode 125, a secondary capacitor 127, and a secondary diode 128. The alternating current introduced by the switching circuit 111 successively charges the primary capacitor 112 to the input voltage 102 through the primary diode 125, then the secondary capacitor 127 to twice the input voltage 102 through the secondary diode 128. The charges of the secondary capacitors 127 are then added in series to generate a theoretical 2n times the input voltage 102, where n is the number of stages. Depending on the arrangement of the diodes and capacitors, the output voltage is either the same polarity or the opposite polarity as the input voltage 102. In the arrangement shown, the output voltage is the opposite polarity to the input voltage. In one embodiment, the value of capacitance of each capacitor in the voltage multiplier circuit 113 is the same. In other embodiments, the value of at least some capacitors differs. For example, advantageously, in one embodiment, capacitors with a higher capacitance are used in earlier stages of the voltage multiplier circuit 113, and capacitors with lower capacitance are used in the later stages. This varying of capacitor values is designed to reduce ripple in the output voltage, which is commonly produced by voltage multiplier circuits 113.

Due to their nature, voltage multiplier circuits 113 are generally used to generate high voltages with low currents. As the voltage is stepped up, the current is necessarily decreased. The fewer stages that are used to increase the voltage, the less the current drops. Therefore, there is a design tradeoff between necessary voltage and necessary current. The capacitors of different stages may be arranged in series, or they may be arranged such that they share common connections. Arranging the capacitors of different stages in series maximizes the voltage multiplication consequently the current drop. On the other hand, capacitors of different stages configured to share common connections produce a voltage multiplier circuit 113 that is better suited to applications where lower output voltages and higher currents are needed. When the capacitors are arranged to share common connections, they must have higher voltage ratings.

Voltage multiplier circuits 113 are generally small and light, and composed of relatively inexpensive components. They have the advantage that the voltage across each stage of the multiplier is at most only two times the input voltage. In addition to making the multiplier easy to insulate, and permitting the use of low cost components, this offers particular advantages in radiation rich environments. High voltage components are more susceptible to output changes due to radiation. For example, high voltage diodes and transistors are lightly doped, whereas low voltage diodes and transistors are heavily doped. Over time, exposure to radiation causes impurities to be introduced into the junctions of both the diodes and transistors. Where the diode or transistor is heavily doped, the percentage of impurities is relatively low, and therefore has a minimal effect. However, where the diode or transistor is lightly doped, the percentage of impurities is high, which causes leakage across the junction, and decreases the effectiveness of the component. Therefore low voltage components are preferable in devices that will be exposed to high levels of radiation.

Ideally a voltage multiplier circuit 113 doubles the input voltage 102 at each stage. For example, a single stage voltage multiplier circuit 113 would generate two times the input voltage 102, a two stage multiplier would generate four times the input voltage 102, a three stage multiplier would generate six times the input voltage 102, and so on. However, once a load is attached, the output voltage is reduced. Minor fluctuations in the load impedance also produce large fluctuations in the output voltage. Additionally, electrical components are not ideal, and therefore each component introduces its own impedance, further reducing the generated voltage. For example a standard diode drops the voltage across it by six tenths of a volt. The voltage loss within the multiplier becomes increasingly large as further stages are added. The possibility of voltage arcing also increases with the introduction of additional stages. Therefore, in some embodiments, the actual output from the voltage multiplier circuit 113 is less than 2n times the voltage input 102.

In an alternative embodiment, the voltage reference circuit 100 is adapted such that voltage can be drawn from any stage of the voltage multiplier circuit 113. Depending on the present needs of the circuit, it can draw voltage from, for example, the first stage 114 if only twice the input voltage 102 is required, or the second stage 118 if four times the input voltage 102 is required. This increases the versatility of a single circuit.

In further alternative embodiments, a step up transformer is used as the voltage multiplier circuit 113 to increase the input voltage to the necessary value. Advantageously, a transformer typically produces less ripple than other multiplier circuits, and thus certain circuits using a transformer require less complex filters.

To enable the voltage reference circuit 100 to be able to maintain a constant voltage even where changes occur in the load impedance, or in individual component characteristics over time, a voltage regulator 115 is implemented in some embodiments. A voltage regulator maintains a constant voltage by adjusting its internal resistance in relation to changes, for example, in the load resistance. Voltage regulators 115 are divided into two broad categories comprising switching regulators and linear regulators. Linear voltage regulators are further divided into shunt regulators and series regulators. In a shunt regulator the regulator is in parallel with the load, as compared to a series regulator wherein it is in series with the load. Voltage regulators 115 are also divided into open loop regulators and closed loop regulators. In an open loop regulator, the voltage control is inherent in an element of the regulator, whereas in a closed loop regulator a feedback control system is used to maintain a constant voltage.

FIG. 5 illustrates a circuit diagram of a voltage regulator 115, wherein the voltage regulator 115 is a linear, closed loop, shunt voltage regulator, in accordance with one aspect of the present invention. In the illustrated embodiment, the voltage regulator 115 comprises an error amplifier 135, a pass element 137, a reference voltage 140, and a feedback network 142. The voltage output from the voltage multiplier circuit 113 is connected to one terminal of the error amplifier 135. The actual voltage received by the error amplifier 135 is a fraction of the output from the voltage multiplier 113 based on, for example, resistors 145 and 147. Depending on design considerations, the output may be connected to either the positive or negative terminal of the error amplifier 135. As shown, the output is connected to the positive terminal. The reference voltage 140 is connected to the other terminal. The voltage that is output from the multiplier should be sufficiently higher than the regulated voltage (error amplifier 135 output) to assure proper operation of the voltage regulator 115. The error amplifier 135 compares the two inputs, and outputs an error based on their difference. The error that is output is a multiple of the reference voltage 140, whose value is based on the arrangement and selection of the elements in the voltage regulator 115. This error is combined with the voltage multiplier output to generate a regulated voltage through the feedback network 142. The regulated voltage maintains a constant value, determined by the configuration of the voltage regulator 115.

It is very important that the reference voltage 140 remain stable. Since the voltage output of the voltage multiplier circuit 113 is compared to the reference voltage 140, any change in the reference voltage 140 will significantly alter the error value measured by the error amplifier 135. The reference voltage 140 may be a band gap-type reference or, for example, a zener diode.

Another component that is added to a voltage regulator 115 in some embodiments is a pass element 137. The pass element 137 serves as a voltage controlled resistance and helps regulate the output voltage going to the load. An effective device to use as a pass element is a PNP junction transistor 149, as illustrated.

In alternative embodiments series voltage regulators are used. Series regulators are the most common type of linear voltage regulator, and share a number of advantages over shunt voltage regulators. Since series regulators are more common, they may be found in monolithic form, built into integrated circuits. In some applications, series regulators are also more efficient than shunt regulators.

The regulated voltage finally passes through an output filter 108 in some embodiments. A filter is a circuit or circuit element that alters the amplitude and/or phase characteristics of an electronic signal with respect to frequency. The output filter 108 is used generally to filter out noise generated by the circuit. More specifically, voltage multipliers commonly emit a ripple, whose effects increase as further stages are added to the multiplier. To ameliorate or eliminate this ripple, a filter is necessary in some embodiments. In some embodiments, an input filter 106 is also inserted to filter the input voltage 102 before it enters the switching circuit 111. In one embodiment, the input filter 106 and output filter 108 are substantially the same, and in other embodiments they use different configurations. FIGS. 6a and 6b illustrate circuit diagrams of one possible configuration of an input filter 106 and an output filter 108 respectively, in accordance with an embodiment of the present invention. The illustrated embodiments depict passive filters, made up of only passive elements such as capacitors 152, inductors 154, and resistors 156. Passive filters share a number of advantages. Because passive filters have no active elements, they do not require a power supply. They may also be used at high frequencies and at high voltage and current. However, passive filters are not capable of supplying any gain, which may be required in certain circuit configurations.

In alternative embodiments, the filters comprise active filters. Active filters use amplifying elements such as op amps, along with capacitors and resistors, to perform substantially the same function as passive filters. Active filters have the advantage that they can introduce gain into the signal, and they are generally easier to design than passive filters.

Figure 7:
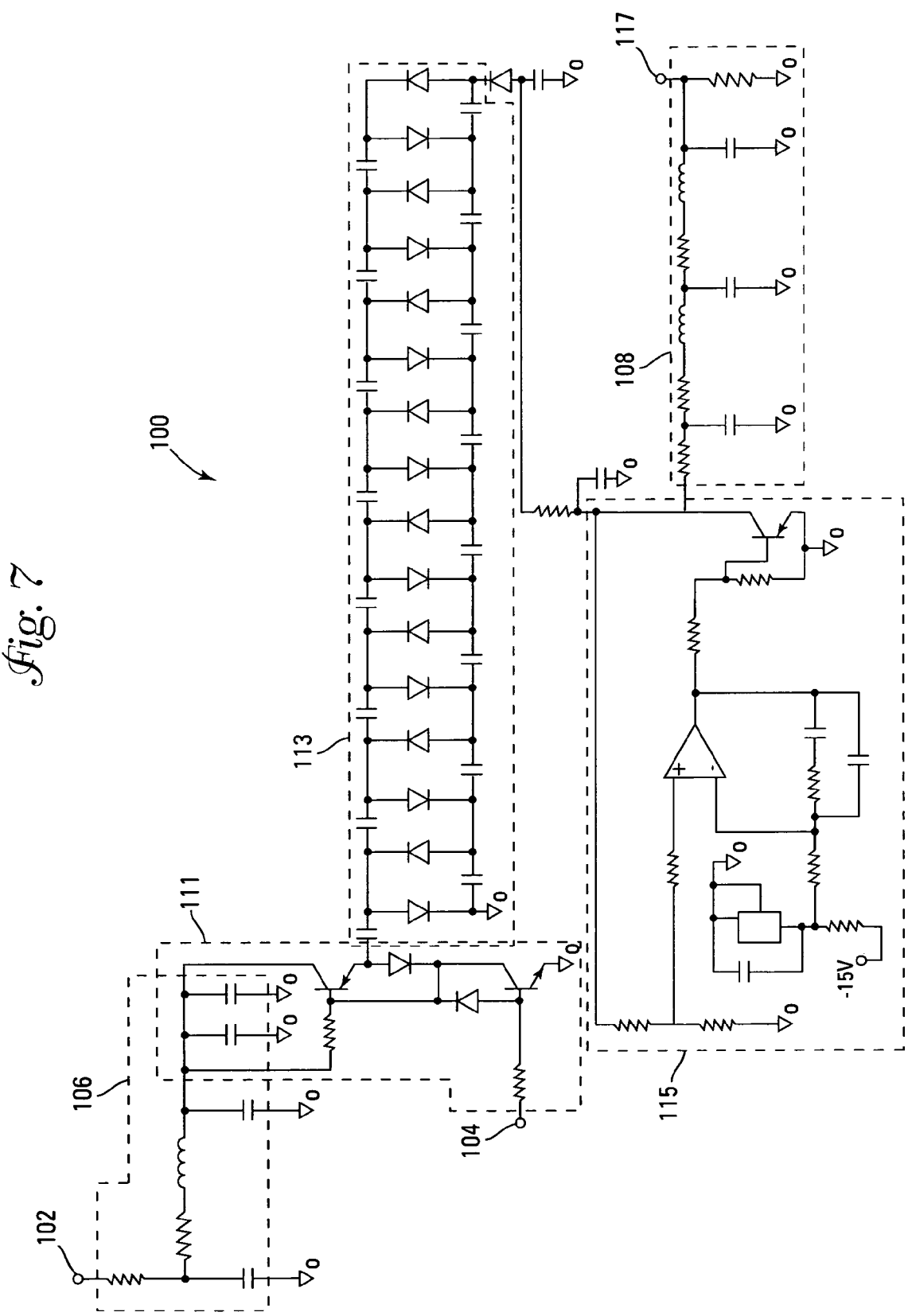
FIG. 7 is a circuit diagram of a voltage reference circuit in accordance with an embodiment of the present invention.

FIG. 7 shows a circuit diagram of one possible configuration of a voltage reference circuit 100 in accordance with an embodiment of the present invention. Where possible, the same reference numbers are used for the same or like components as in previous figures. An input voltage 102 of fifteen volts first travels through an input filter 106 to a switching circuit 111. The switching circuit 111 receives the filtered input voltage 102 and a 250 kHz square wave input signal 104 that may be generated by a field programmable gate array, and generates an alternating current. The alternating current is received by the voltage multiplier circuit 113, comprising an eight stage voltage multiplier circuit 113. The voltage multiplier circuit 113 then outputs a voltage at approximately negative seventy-five volts. The voltage regulator 115 monitors the output of the voltage multiplier circuit 113 and modifies it such that a constant voltage of negative sixty volts is sent to the voltage output 117 after being filtered by the output filter 108. In one embodiment, the output voltage has a tolerance of three hundred millivolts. The illustrated voltage regulator 115 comprises a shunt closed loop voltage regulator, and the illustrated filters comprise passive filters. Any changes in output impedance or component characteristics are rectified by the voltage regulator 115, thus creating a constant, precise, temperature stable voltage reference.

In view of the foregoing, it will be understood by those skilled in the art that the methods of the present invention can be used in conjunction with other electronic circuits and networks. The above embodiments have been presented by way of example and not by way of limitation. Variations and modifications may occur, which fall within the scope of the present invention, as set forth in the following claims.

What is claimed is:

1. A voltage reference circuit comprising:
   a first port, adapted to receive an input voltage;
   a second port, adapted to receive a time varying input signal;
   a switching circuit, responsive to the first and the second ports, the switching circuit generating an AC signal from the input voltage;
   a voltage multiplier circuit, coupled to the switching circuit to receive the AC signal and to create a DC signal with a selected voltage level, wherein the voltage multiplier circuit comprises a plurality of multiplying stages having at least one capacitor in each stage, the at least one capacitor at one or more early stages having a different capacitance than the at least one capacitor at one or more later stages;
   a voltage regulator, coupled to the voltage multiplier circuit, that regulates the DC signal from the voltage multiplier circuit; and
   an output port, coupled to the voltage regulator, that is adapted to provide a regulated output voltage.

2. The voltage reference circuit of claim 1, wherein each multiplying stage is comprised of two capacitors and two diodes.

3. The voltage reference circuit of claim 1, wherein the at least one capacitor of the voltage multiplier circuit at one or more early stages having higher capacitance and the at least one capacitor at one or more later stages having lower capacitance.

4. The voltage reference circuit of claim 2, wherein the two capacitors of each stage comprise a primary capacitor and a secondary capacitor, the primary capacitors of different stages are in series and the secondary capacitors of different stages are in series.

5. The voltage reference circuit of claim 2, wherein the two capacitors of each stage comprise a primary capacitor and a secondary capacitor, the primary capacitor of each of the different stages shares a common connection with at least one other primary capacitor and the secondary capacitor of each of the different stages shares a common connection with at least one other secondary capacitor.

6. The voltage reference circuit of claim 1, wherein the output port is configurable to be taken from a selected stage of the voltage multiplier circuit.

7. The voltage reference circuit of claim 1, wherein a diode is used to ensure that only the desired voltage polarity is output from the voltage multiplier circuit.

8. The voltage reference circuit of claim 1, wherein the time varying input signal is selected from a list comprising a square wave input, a sinusoidal input, and a triangle wave input.

9. The voltage reference circuit of claim 1, wherein the time varying input signal has a frequency chosen from a list of frequencies ranging from 125 kHz to 500 kHz.

10. The voltage reference circuit of claim 1, wherein the voltage regulator is a linear voltage regulator.

11. The voltage reference circuit of claim 10, wherein the linear voltage regulator is selected from a list comprising a series voltage regulator and a shunt voltage regulator.

12. An electronic device comprising an electronic circuit attached to a voltage reference circuit, wherein the voltage reference circuit comprises:
- a first port adapted to receive an input voltage;
- a second port adapted to receive a time varying input signal;
- a switching circuit, responsive to the first and second ports, the switching circuit generating an AC signal from the input voltage;
- a voltage multiplier circuit, coupled to the switching circuit to receive the AC signal and to create a DC signal with a selected voltage level, wherein the voltage multiplier circuit comprises a plurality of multiplying stages having at least one capacitor in each stage, the at least one capacitor at one or more early stages having a different capacitance than the at least one capacitor at one or more later stages;
- a voltage regulator, coupled to the voltage multiplier circuit, that regulates the DC signal from the voltage multiplier circuit; and
- an output port, coupled to the voltage regulator, that is adapted to provide a regulated voltage.

13. The electronic device of claim 12, wherein the electronic device is a sensor.

14. The electronic device of claim 13, wherein the sensor is a MEMS inertial sensor.

15. The electronic device of claim 12, wherein the voltage reference circuit further comprises a plurality of filters.

16. The electronic device of claim 12, wherein the voltage reference circuit comprises low voltage components, and wherein active components are highly doped.

17. The electronic device of claim 12, wherein the voltage reference circuit is adapted for use in a radiation rich environment.

18. A method for supplying a reference voltage comprising:
- generating an alternating current signal from a direct current input voltage and a time varying input signal;
- generating a DC voltage signal from the alternating current signal that is greater in magnitude than the direct current input voltage, wherein the DC voltage signal is generated using a plurality of multiplying stages with at least one capacitor in each stage, the at least one capacitor at one or more early stages having a different capacitance than the at least one capacitor at one or more later stages;
- regulating the generated DC voltage signal; and
- delivering the regulated DC voltage signal.

19. The method of claim 18, wherein generating the DC voltage signal comprises generating the DC voltage signal in a voltage multiplier circuit.

20. The method of claim 18, wherein introducing a time varying signal comprises introducing one of a square wave, a triangle wave, and a sinusoidal wave.

21. A voltage reference apparatus comprising:
- a switching circuit that generates an AC signal from a DC input and a time varying input signal;
- a voltage multiplier circuit, coupled to the output of the switching circuit, that receives the AC signal and generates a DC signal with a selected voltage level, wherein the voltage multiplier circuit comprises a plurality of multiplying stages having at least one capacitor in each stage, the at least one capacitor at one or more early stages having a different capacitance than the at least one capacitor at one or more later stages; and
- a voltage regulator circuit, coupled to the voltage multiplier circuit, that regulates the DC signal from the voltage multiplier circuit.

22. The voltage reference apparatus of claim 21, wherein the DC signal generated by the voltage multiplier circuit is higher than the AC signal generated by the switching circuit.

23. The voltage reference apparatus of claim 21, wherein the switching circuit comprises at least two transistors that are activated alternatively.

24. The voltage reference apparatus of claim 21, wherein the plurality of multiplying stages are stacked in series.

25. The voltage reference apparatus of claim 21, wherein the voltage regulator circuit comprises:
- an error amplifier having a first input, a second input, and an error output, wherein the first input is coupled to a reference voltage and the second input is coupled to the voltage multiplier circuit;
- a pass element, wherein one end of the pass element is coupled to the error output and another end is coupled to the voltage multiplier circuit; and
- a feedback network, coupling the second input to the error output of the error amplifier.

26. A voltage reference circuit comprising:
- a first port, adapted to receive an input voltage;
- at least one input filter, coupled to the first port, that filters the input voltage;
- a second port, adapted to receive a time varying input signal;
- a switching circuit, responsive to the first and the second ports, the switching circuit generating an AC signal from the input voltage;
- a voltage multiplier circuit, coupled to the switching circuit to receive the AC signal and to create a DC signal with a selected voltage level, wherein the voltage multiplier circuit comprises a plurality of multiplying stages having at least one capacitor in each stage, the at least one capacitor at one or more early stages having a different capacitance than the at least one capacitor at one or more later stages;
- a voltage regulator, coupled to the voltage multiplier circuit, that regulates the DC signal from the voltage multiplier circuit;
- an output port, coupled to the voltage regulator, that is adapted to provide a regulated output voltage; and
- at least one output filter, coupled to the output port, that filters the regulated output voltage.

27. The voltage reference circuit of claim 26, wherein the input filter and output filter comprise passive filters.

28. A voltage reference apparatus comprising:
- a switching circuit that generates an AC signal from a DC input and a time varying input signal;
- a voltage multiplier circuit, coupled to the output of the switching circuit, that receives the AC output and generates a DC signal with a selected voltage level at an output port, wherein the voltage multiplier circuit comprises a plurality of multiplying stages having at least one capacitor in each stage, the at least one capacitor at one or more early stages having a different capacitance than the at least one capacitor at one or more later stages;
- a voltage regulator circuit, coupled to the voltage multiplier circuit, that regulates the DC signal from the voltage multiplier circuit; and
- a plurality of filters, coupled to the voltage regulator circuit at one or more locations.

29. The voltage reference apparatus of claim 28, wherein the plurality of filters comprises an input filter and an output filter, the input filter coupled to the DC input and the output filter coupled to the output port.

30. A method for supplying a reference voltage comprising:
- introducing a direct current input voltage;
- filtering the direct current input voltage;
- introducing a time varying input signal;
- generating an alternating current signal from the filtered direct current input voltage and the time varying input signal using a plurality of multiplying stages having at least one capacitor in each stage, the at least one capacitor at one or more early stages having a different capacitance than the at least one capacitor at one or more later stages;
- generating a DC voltage signal from the alternating current signal that is greater in magnitude than the direct current input voltage;
- regulating the generated DC voltage signal;
- filtering the regulated DC voltage signal; and
- delivering the regulated DC voltage signal.

* * * * *